US012258913B2

(12) United States Patent
Malick

(10) Patent No.: US 12,258,913 B2
(45) Date of Patent: Mar. 25, 2025

(54) METHOD OF CONTROLLING AN EXHAUST VALVE ARRANGEMENT

(71) Applicant: VOLVO TRUCK CORPORATION, Gothenburg (SE)

(72) Inventor: Stephen Malick, Stokesdale, NC (US)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/497,057

(22) Filed: Oct. 30, 2023

(65) Prior Publication Data

US 2024/0141840 A1 May 2, 2024

(30) Foreign Application Priority Data

Nov. 1, 2022 (EP) .................................... 22204844

(51) Int. Cl.
*F02D 13/02* (2006.01)
*F02D 41/00* (2006.01)

(52) U.S. Cl.
CPC ..... *F02D 13/0203* (2013.01); *F02D 41/0005* (2013.01)

(58) Field of Classification Search
CPC .................................................. F02D 13/0203
See application file for complete search history.

(56) References Cited

U.S. PATENT DOCUMENTS

2018/0187579 A1 7/2018 Cecur

FOREIGN PATENT DOCUMENTS

| | | | |
|---|---|---|---|
| DE | 10242758 | A1 | 3/2004 |
| DE | 102017210769 | A1 | 12/2018 |
| WO | 2013130661 | A1 | 9/2013 |
| WO | 2015195037 | A1 | 12/2015 |
| WO | 18013973 | A1 | 1/2018 |
| WO | 2019120511 | A1 | 6/2019 |

OTHER PUBLICATIONS

Extended European Search Report in corresponding European Application No. 22204844.9 dated Apr. 11, 2023 (9 pages).

*Primary Examiner* — Ngoc T Nguyen
(74) *Attorney, Agent, or Firm* — Venable LLP; Jeffri A. Kaminski

(57) ABSTRACT

A method of controlling an exhaust valve arrangement of an internal combustion engine is provided. The exhaust valve arrangement is operable to direct combusted exhaust gas out from a combustion chamber of the internal combustion engine. The exhaust valve arrangement comprises a first exhaust valve and a second exhaust valve. The method includes determining a pressure level in the combustion chamber during compression release braking, comparing the pressure level with a predetermined threshold pressure; and controlling the exhaust valve arrangement to control either a single one, or both, of the first and second exhaust valves to be arranged in an open position during compression release braking in response to the pressure level being below or above the predetermined threshold pressure.

14 Claims, 5 Drawing Sheets

METHOD OF CONTROLLING AN EXHAUST VALVE ARRANGEMENT

TECHNICAL FIELD

The inventive concept relates generally to exhaust valve arrangements for internal combustion engines. In particular aspects, the inventive concept relates to a method of controlling an exhaust valve arrangement of an internal combustion engine. The inventive concept can be applied in heavy-duty vehicles, such as trucks, buses, and construction equipment. Although the inventive concept may be described with respect to a particular vehicle, the inventive concept is not restricted to any particular vehicle.

BACKGROUND

The speed of heavy-duty vehicles can be controlled by service brakes as well as by operating an internal combustion engine to assume a compression release brake operation. During the compression release brake operation, the exhaust valves are opened at the top of the compression stroke. Hereby, the energy contained in the compressed air is released into the atmosphere instead of being returned to the crankshaft. The compressed air is thus released before the piston begins its downward travel.

However, the cylinder of the engine is exposed to various pressure levels during operation and compression release brake may not be as efficient as desirable during high cylinder pressures. It is therefore a desire to improve the compression release brake to be efficiently operable at a wider pressure range within the cylinder.

SUMMARY

According to a first aspect of the inventive concept, there is provided a method of controlling an exhaust valve arrangement of an internal combustion engine, the exhaust valve arrangement is operable to direct combusted exhaust gas out from a combustion chamber of the internal combustion engine, wherein the exhaust valve arrangement comprises a first exhaust valve and a second exhaust valve, the method comprising determining a pressure level in the combustion chamber during compression release braking, comparing the pressure level with a predetermined threshold pressure; and controlling the exhaust valve arrangement to control either a single one, or both, of the first and second exhaust valves to be arranged in an open position during compression release braking in response to the pressure level being below or above the predetermined threshold pressure.

The first aspect of the inventive concept may seek to solve the problem of handling compression release braking operation at different pressure levels in the combustion chamber. The present inventive concept is based on the insight that compression release braking can be handled by releasing different levels of compressed air to the atmosphere based on the pressure level in the combustion chamber. A technical benefit may thus include that a more versatile compression release braking can be achieved, which is operable for high—as well as low pressure levels in the combustion chamber.

In some examples, the exhaust valve arrangement may be configured to control the first exhaust valve to be arranged in the open position and to arrange the second exhaust valve in a closed position when the pressure level in the combustion chamber is above the predetermined threshold pressure. A single exhaust valve may hereby be opened during compression release braking when the pressure level is relatively high. A technical benefit may include that the compression release braking operation is more responsive.

In some examples, the exhaust valve arrangement may be configured to control the first and second exhaust valves in the open position when the pressure level in the combustion chamber is below the predetermined threshold pressure. When the pressure level is lower, both exhaust valves may be arranged in the open position to increase the compression release and thus in turn increase the braking action of the vehicle. A technical benefit may include that the compression release braking operation can be run more efficiently at a longer duration.

In some examples, each of the first and second exhaust valves may be controllable to be arranged in the open position and the closed position independently of a crank angle degree of a reciprocating piston arranged in a combustion cylinder of the internal combustion engine. A technical benefit may include that each of the exhaust valves may be controlled solely based on the pressure level in the combustion chamber to rapidly change from controlling a single exhaust valve to be open, to opening both exhaust valves when the pressure level falls below the predetermined threshold pressure.

In some examples, the exhaust valve arrangement may comprise a first actuator operable to arrange the first exhaust valve in the open position when exposed to a flow of pressurized fluid. Thus, compared to a conventional exhaust valve operably connected to a cam shaft following the rotational motion of crankshaft, the first exhaust valve may here be operable by flow of pressurized fluid, independently of the rotational motion of the crankshaft. A technical benefit may include that the pressurized fluid can be rapidly fed to the first actuator to open the first exhaust valve when desirable. Thus, and in some examples, the method may further comprise controlling a first valve of the first actuator to force the first exhaust valve to be arranged in the open position when the pressure in the combustion chamber is above the predetermined threshold pressure.

In some examples, the exhaust valve arrangement may comprise a second actuator operable to arrange the second exhaust valve in the open position when exposed to a flow of pressurized fluid. In a similar vein as described above, also the second exhaust valve may here be operable by flow of pressurized fluid, independently of the rotational motion of the crankshaft. A technical benefit may include that the pressurized fluid can be rapidly fed to the second actuator to open the second exhaust valve when desirable. Thus, and in some examples, the method may further comprise controlling a second valve of the second actuator to force the second exhaust valve to be arranged in the open position when the pressure in the combustion chamber is below the predetermined threshold pressure.

In some examples, each of the first and second exhaust valve may be a pneumatically operable valve. A technical benefit may include that pneumatics may be rapid in its control of the valves.

In some examples, the internal combustion engine may further comprise at least one intake valve controllable to direct air into the combustion chamber during an intake stroke. In some examples, the at least one intake valve may be controllable to be arranged in an open position and a closed position independently of a position of a reciprocating piston arranged in a combustion cylinder of the internal combustion engine. The at least one intake valve may preferably be operable by an intake actuator operable by a flow of pressurized fluid. Hence, when feeding pressurized fluid to the intake actuator, the at least one intake valve is opened. In a similar vein as for the first and second actuators, the intake actuator may be a pneumatically controlled actuator.

According to a second aspect of the inventive concept, there is provided an exhaust valve arrangement operable to direct combusted exhaust gas out from a combustion chamber of an internal combustion engine, the exhaust valve arrangement comprising a first exhaust valve, a second exhaust valve, and processor device operable to control the first and second exhaust valves to assume an open and closed position, respectively, the processor device being configured to determine a pressure level in the combustion chamber during compression release braking, compare the pressure level with a predetermined threshold pressure; and control the exhaust valve arrangement to arrange either a single one, or both, of the first and second exhaust valves in an open position during compression release braking in response to the pressure level being below or above the predetermined threshold pressure.

Effects and features of the second aspect are largely analogous to those described above in relation to the effects and features of the first aspect.

According to a third aspect of the inventive concept, there is provided a vehicle comprising an internal combustion engine, the internal combustion engine comprising an exhaust valve arrangement according to the above described second aspect.

According to a fourth aspect of the inventive concept, there is provided a computer program product comprising program code for performing, when executed by the processor device, the method of any of the examples described above in relation to the first aspect.

According to a fifth aspect of the inventive concept, there is provided a control system comprising one or more control units configured to perform the method according to any of the examples described above in relation to the first aspect.

According to a sixth aspect of the inventive concept, there is provided a non-transitory computer-readable storage medium comprising instructions, which when executed by the processor device, cause the processor device to perform the method of any of the examples described above in relation to the first aspect.

Effects and features of the third, fourth, fifth and sixth aspects are largely analogous to those described above in relation to the effects and features of the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the inventive concept cited as examples.

DETAILED DESCRIPTION

Aspects set forth below represent the necessary information to enable those skilled in the art to practice the inventive concept.

The inventive concept described in the following with reference to the drawings may seek to solve the problem of handling compression release braking operation at different pressure levels in the combustion chamber. An overall technical advantage of the below disclosure may thus be that a more versatile compression release braking can be achieved, which is operable for high—as well as low pressure levels in the combustion chamber.

Figure 1:
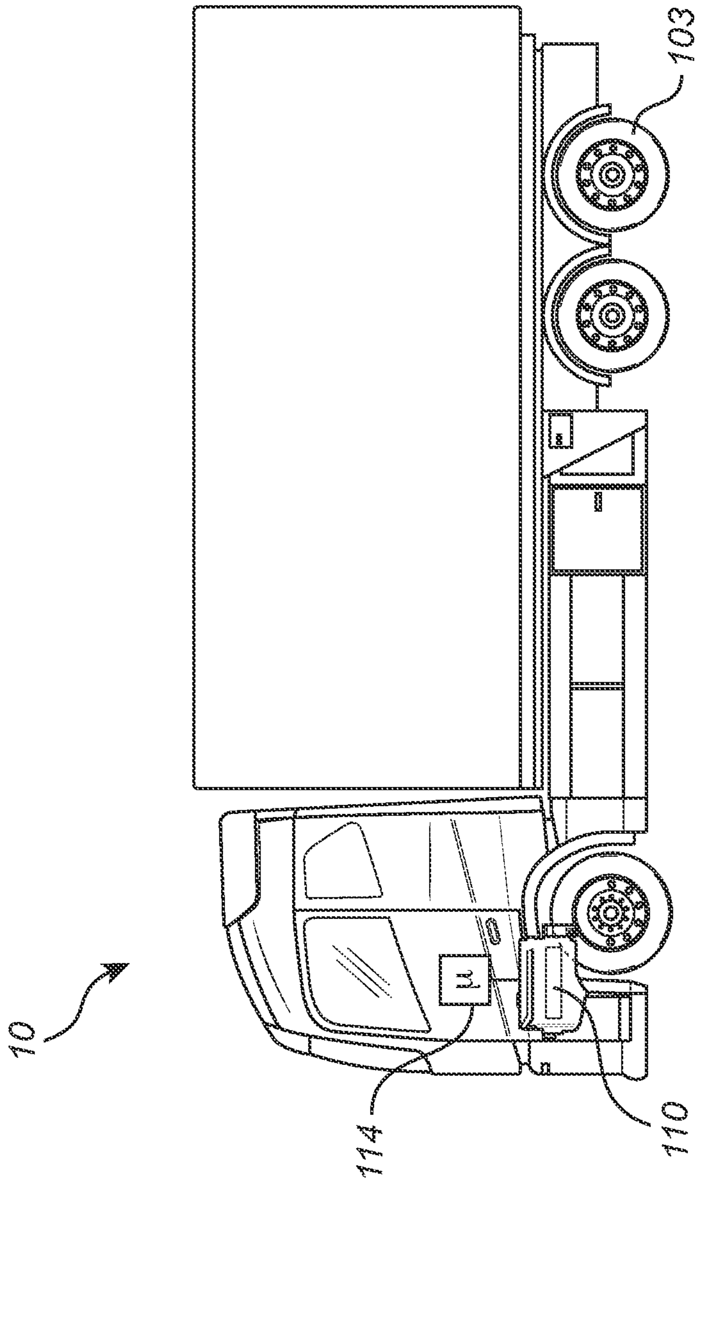
FIG. 1 is lateral side view of a vehicle in the form of a truck according to one example.

With reference to FIG. 1, there is depicted a vehicle 10 in the form of a truck. The vehicle 10 comprises a traction motor 101. The traction motor 101 is preferably an internal combustion engine and will in the following be referred to as such. The internal combustion engine 101 is operable to propel at least one pair of wheels 103 of the vehicle 10. The vehicle 101 in FIG. 1 also comprises a control unit 114. The control unit 114 comprises a processor device (depicted in further detail in FIG. 6). The processor device is operatively coupled at least to an exhaust valve arrangement, as will be evident below.

Figure 2:
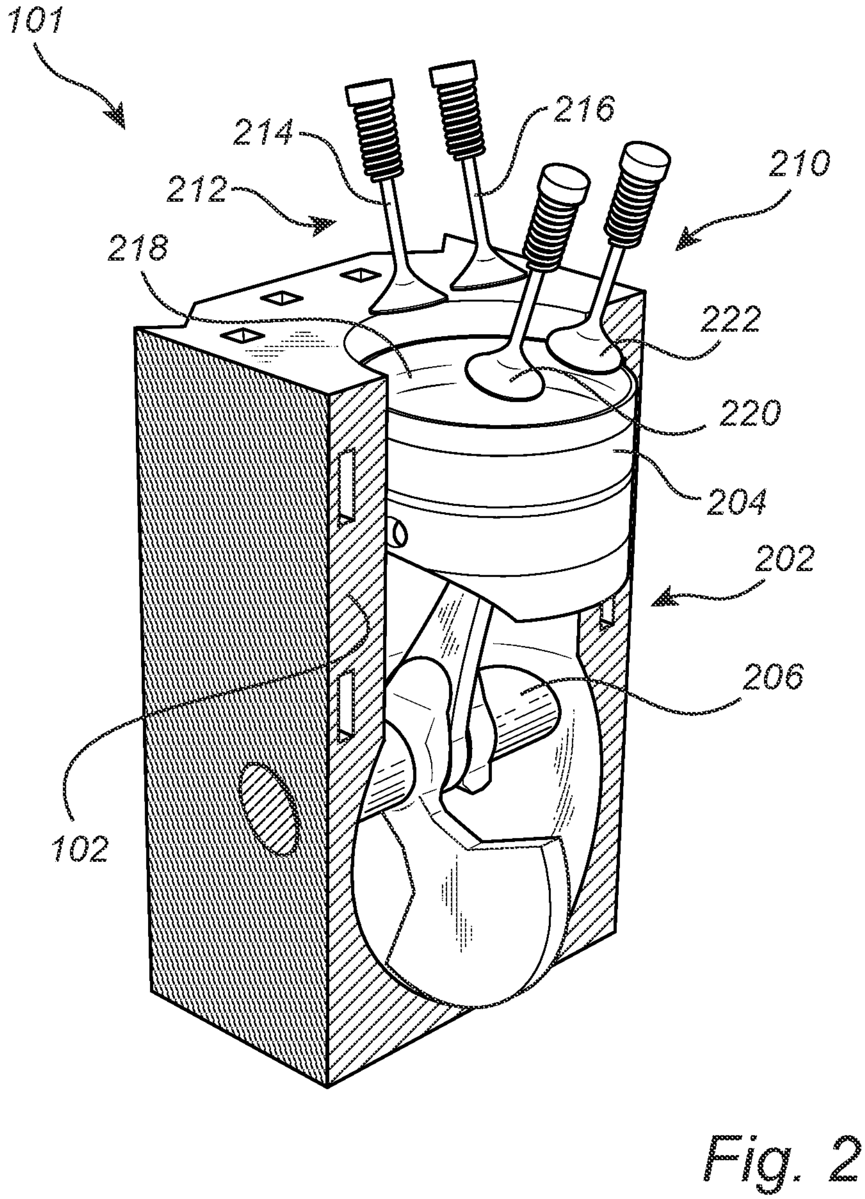
FIG. 2 is a schematic illustration of a cylinder and associated structure of an internal combustion engine according to an example.

Reference is now made to FIG. 2, which is a schematic illustration of a combustion cylinder 202 and associated structure of a combustion cylinder 102 of the internal combustion engine 101 according to an example. In further detail, the combustion cylinder 202 comprises a reciprocating piston 204 connected to a crank shaft 206 by a piston rod 208. Further, the combustion cylinder 202 comprises an exhaust valve arrangement 210 and an intake valve arrangement 212.

The intake valve arrangement 212 comprises at least one intake valve 214. In the example of FIG. 2, the intake valve arrangement 212 comprises a first intake valve 214 and a second intake valve 216. The intake valve arrangement 212 is configured to allow air to enter a combustion chamber 218 of the combustion cylinder 202, preferably during an intake stroke when the piston is moving from a top dead center (TDC) position towards a bottom dead center position (BDC).

The exhaust valve arrangement 210 comprises a first exhaust valve 220 and a second exhaust valve 222. The exhaust valve arrangement 210 is operable to direct combusted exhaust gas out from the combustion chamber 218 during an exhaust stroke when the piston moves from the BDC towards the TDC.

The internal combustion engine 101 depicted in FIGS. 1 and 2 is also configured to be operated in a compression release brake mode. During compression release braking, also conventionally referred to as Jacobs Brake or Jake Brake, the exhaust valve arrangement 210 is arranged in an open state before the compression stroke ends, i.e. before the piston 204 reaches the TDC in the compression stroke. The compressed air in the combustion chamber 218 will hereby be released and the vehicle 10 will slow down. The energy absorbed by the compression stroke may not be returned to the crank shaft when opening the exhaust valve arrangement 210 before the end of the compression stroke, which would be the case when operating the internal combustion engine 101 in a conventional manner, i.e. when not being operated to assume compression release braking.

The present inventive concept is however based on the realization that compression release braking can be handled in a different manner based on the pressure level in the combustion chamber to enable for a more versatile compression release braking. Reference is therefore made to FIG. 2 in combination with FIG. 3 for a more elaborated description of the inventive concept.

Figure 3:
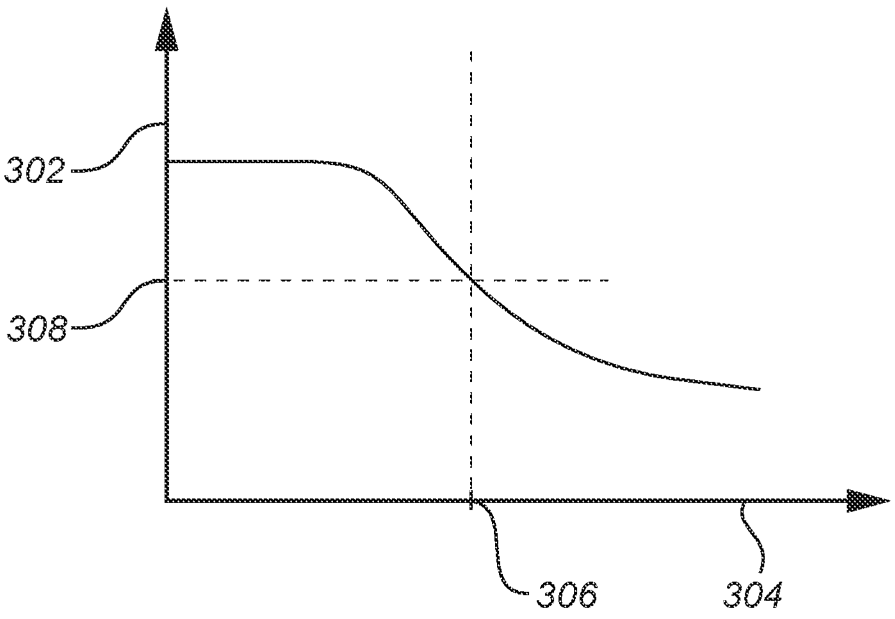
FIG. 3 is a graph illustrating operation of an exhaust valve arrangement of an internal combustion engine according to an example.

FIG. 3 is a graph illustrating operation of an exhaust valve arrangement of an internal combustion engine according to an example. In particular, the vertical axis 302 represents the pressure level in the combustion chamber 218, while the horizontal axis 304 represents the duration of time elapsed during compression release braking. As can be seen in FIG. 3, at the initial stage of compression release braking, the pressure level in the combustion chamber 218 is relatively high, while at a later point in time 306, the pressure level falls below a predetermined threshold pressure 308. During compression release braking, the processor device determines a pressure level in the combustion chamber 218, and compares the pressure level with the predetermined threshold pressure 308. The processor device thereafter controls the exhaust valve arrangement 210 to control either a single one, or both, of the first 220 and second 222 exhaust valves to be arranged in the open position during compression release braking in response to the pressure level being below or above the predetermined threshold pressure 308.

In the example depicted in FIG. 3, when the pressure level in the combustion chamber 218 is above the predetermined threshold pressure 308, the exhaust valve arrangement 210 controls the first exhaust valve 220 to be arranged in the open position and controls the second exhaust valve 222 to be arranged in the closed position. At this high pressure level, the compressed air in the combustion chamber 218 is released through a single exhaust port of at least one of the internal combustion engine's cylinder.

On the other hand, when the pressure level in the combustion chamber reduces and falls below the predetermined threshold pressure during the compression release brake operation, the exhaust valve arrangement controls both the first 220 and second 222 exhaust valves to be arranged in the open position. At this lower pressure level the compressed air in the combustion chamber 218 is released through both of the exhaust ports of at least one of the internal combustion engine's cylinder.

Figure 4:
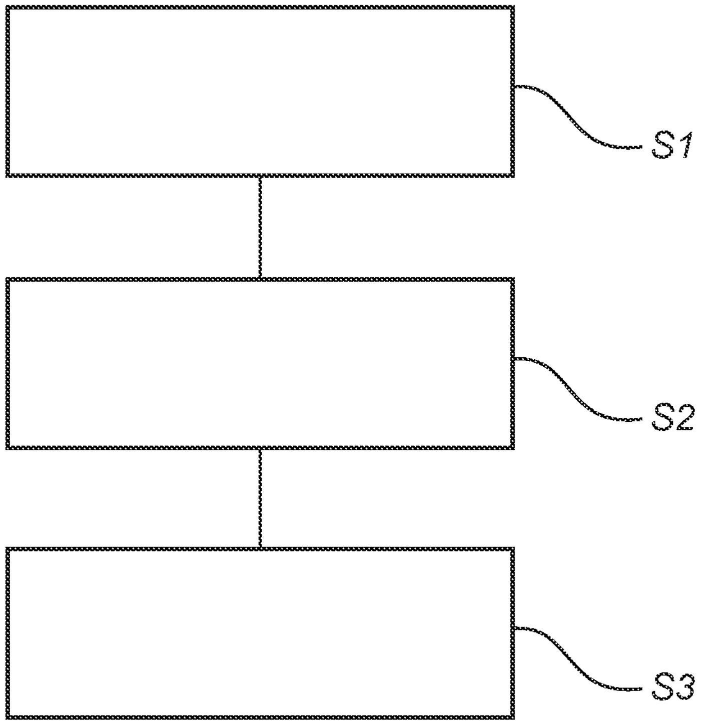
FIG. 4 is a flow chart of a method of controlling an exhaust valve arrangement according to an example.

Hence, based on the above, and with reference to FIG. 4, the exhaust valve arrangement 210 is controlled according to the following during compression release braking. A pressure level in the combustion chamber during compression release braking is determined S1. The pressure level is compared S2 with the predetermined threshold pressure 308. Thereafter, the exhaust valve arrangement 210 is controlled S3 to arrange either a single one, or both, of the first 220 and second 222 exhaust valves the open position during compression release braking in response to the pressure level being below or above the predetermined threshold pressure 308. As indicated above, a single one of the first 220 and second 222 exhaust valves are preferably arranged in the open position when the pressure level is above the predetermined threshold pressure 308, while keeping the other one of the first 220 and second 222 exhaust valves closed, and both of the first 220 and second 222 exhaust valves are preferably arranged in the open position when the pressure level is below the predetermined threshold pressure 308.

Based on the above, each of the first 220 and second 222 exhaust valves is controllable to be arranged in the open position and the closed position independently of a crank angle degree the reciprocating piston 204. An example of such independently controllable exhaust valve will now be given below with reference to FIG. 5.

Figure 5:
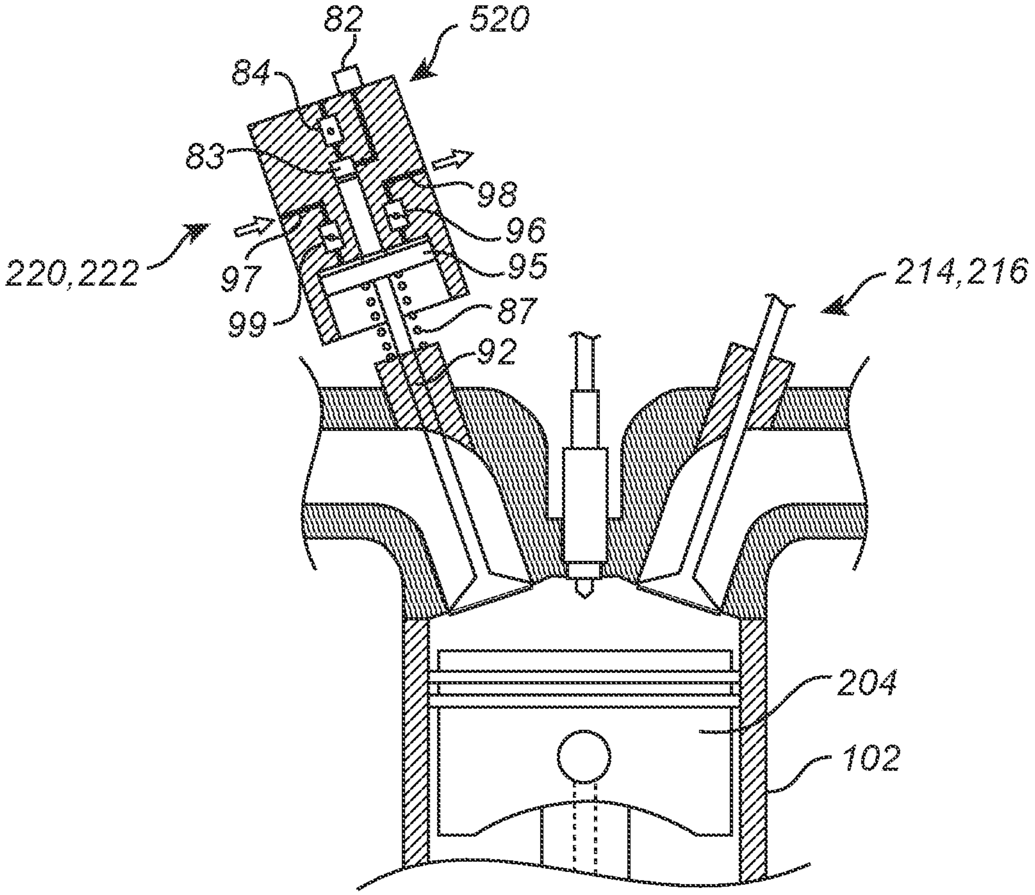
FIG. 5 is a schematic illustration of an exhaust valve according to an example.

In FIG. 5, only the first exhaust valve 220 is depicted for simplifying for the reader. It should however be readily understood that both of the first 220 and second 222 exhaust valves can be operated according to the following disclosure of FIG. 5. Also, the intake valves 214, 216 are not depicted as controllable by a fluidly controlled actuator. However, the each of the intake valves 214, 216 should be construed as also being operable by the same arrangement as the exhaust valves described in the following. Thus, the at least one intake valve 214, 216 may also be controllable to be arranged in an open position and a closed position independently of a position of a reciprocating piston arranged in a combustion cylinder of the internal combustion engine, in a similar vein as described in the following when describing the exemplified exhaust valves.

In detail, FIG. 5 illustrate the combustion cylinder 102, the reciprocating piston 104, the intake valve 214, 216 and exhaust valve 220, 222, wherein the first exhaust valve 220 comprises a first actuator 520, in the form of a flow controllable actuator 520. As is evident, but not described in detail in the following, the second exhaust valve 222 comprises a second actuator, in the form of a flow controllable actuator. The flow controllable actuator is arranged to controllably operate the exhaust valve between the open position and the closed position. The flow controllable actuator 520 is thus preferably connected to the above described processor device of the control unit 114 for controlling operation thereof. The description in relation to FIG. 5 will now solely focus on the flow controllable actuator 520 for presenting an example embodiment of how to control the operation of the first exhaust valve 220.

The first exhaust valve 220 thus comprises the flow controllable actuator 520 operatively connected to a valve member 92. The valve member is here a lift type valve member. By way of example, the lift type member can be a conventional poppet valve or the like, as shown in e.g. FIG. 2. However, the valve member may likewise be provided as a rotational type valve member, a slide valve member, a seat valve member or the like. The actuator of the valve is configured to operate the valve member 92 by pneumatic pressure. As such, the valve member is a pressure activated valve member. In this example, the flow controllable actuator 520 comprises a pneumatic actuator operatively connected to a corresponding valve member. In particular, the actuator 520 of the first exhaust valve 220 is configured to operate the valve member via an actuator piston 95. The actuator 520 is in fluid communication with a pressurized air medium (not shown) via an air inlet 97 and an air outlet 98. In this manner, the pneumatic valve actuation utilizes compressed air to control the valve opening of the valve member, i.e. to operate the valve member between an open state and a closed state. Accordingly, the actuator comprises at least the air inlet 97 for the pressure fluid medium and at least the air outlet 98 for the pressure fluid medium. The pressurized air flowing in via the air inlet 97 is directed towards the actuator piston 95 by means of an air inlet valve 99. The air inlet valve 99 is disposed in the air inlet and configured to open and close the air inlet so as to control the flow of air to the actuator piston 95. Further, there is disposed an air outlet valve 96 in the air outlet 98, which is configured to open and close the air outlet in order to permit air to discharge from the actuator. Typically, as shown in FIG. 5, the actuator piston 95 is disposed in a chamber 84 defining a space for a reciprocating movement of the actuator piston 95. The actuator piston 95 is operable between a first position (an upper position), in which the valve member 92 is in the closed state, and a second position (a lower position), in which the valve member 92 is in the open state. The actuator piston 95 is operable between the first position (upper position) and the second position (lower position) by pressurizing and depressurizing the actuator. In addition, the flow controllable valve comprises a spring 87 arranged in-between the valve member 92 and the actuator piston 95 so as to return the valve member to its original position, i.e. corresponding to the upper position of the actuator piston disc 95.

The flow controllable valve may also have a hydraulic circuit comprising a hydraulic valve 84 and a chamber 82. Hydraulic fluid is provided to a chamber 83 in connection with the actuator piston 95. Hereby, when the piston moves to the second position, the hydraulic fluid in the chamber 83 dampen the motion of the actuator piston 95. The hydraulic fluid may also keep the valve stationary at a given position.

Accordingly, and with reference to the description of FIG. 5 in combination with FIG. 3, a first valve of the first actuator 520 is controlled to force the first exhaust valve 220 to be arranged in the open position when the pressure in the combustion chamber 218 is above the predetermined threshold pressure. In a similar manner, and as indicated above, the exhaust valve arrangement 210 comprises a second actuator (not shown, but arranged in the same way as the first actuator) operable to arrange the second exhaust valve 222 in the open position when exposed to a flow of pressurized fluid. A second valve (not shown) of the second actuator is controlled to force the second exhaust valve to be arranged in the open position when the pressure in the combustion chamber is below the predetermined threshold pressure.

Figure 6:
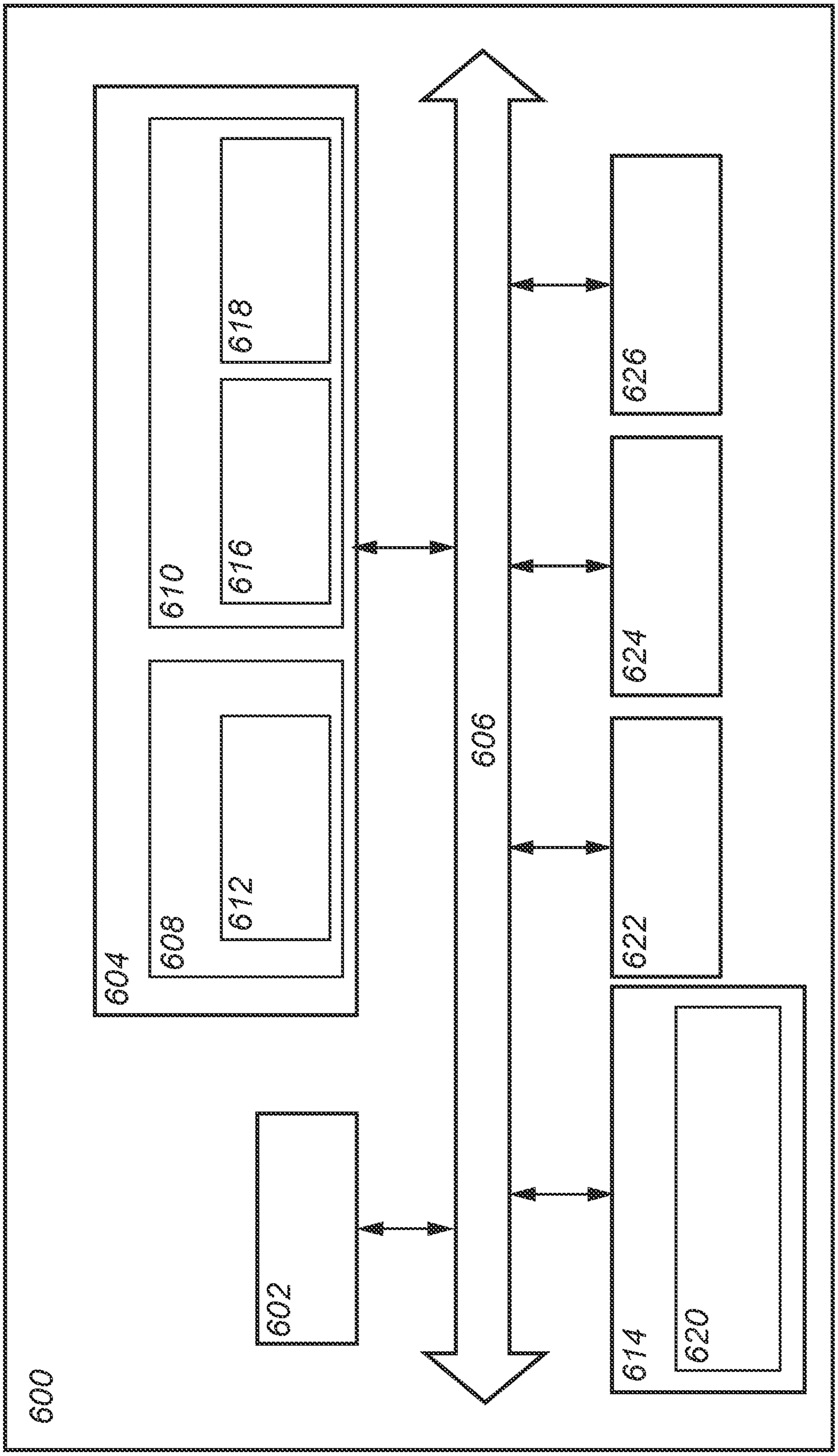
FIG. 6 is a schematic diagram of an exemplary computer system for implementing examples disclosed herein, according to one example.

Reference is now made to FIG. 6, which is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present inventive concept.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present inventive concept is not limited to the aspects described above and illustrated in the drawings; rather, the skilled person will recognize that many changes and modifications may be made within the scope of the present inventive concept and appended claims. In the drawings and specification, there have been disclosed aspects for purposes of illustration only and not for purposes of limitation, the scope of the inventive concepts being set forth in the following claims.

The invention claimed is:

1. A computer-implemented method of controlling an exhaust valve arrangement of an internal combustion engine, the exhaust valve arrangement is operable to direct combusted exhaust gas out from a combustion chamber of the internal combustion engine, wherein the exhaust valve arrangement comprises a first exhaust valve and a second exhaust valve, the method comprising:

determining, by a processor device of a computer system, a pressure level in the combustion chamber during compression release braking, comparing, by the processor device, the pressure level with a predetermined threshold pressure; and controlling, by the processor device, the exhaust valve arrangement to arrange the first exhaust valve to be arranged in an open position and to arrange the second exhaust valve in a closed position when the pressure level in the combustion chamber is above the predetermined threshold pressure.

2. The computer implemented method according to claim 1, wherein the processor device is configured to control the exhaust valve arrangement to arrange the first and second exhaust valves in the open position when the pressure level in the combustion chamber is below the predetermined threshold pressure.

3. The computer implemented method according to claim 1, wherein each of the first and second exhaust valves is controllable to be arranged in the open position and the closed position independently of a crank angle degree of a reciprocating piston arranged in a combustion cylinder of the internal combustion engine.

4. The computer implemented method according to claim 3, wherein the exhaust valve arrangement comprises a first actuator operable to arrange the first exhaust valve in the open position when exposed to a flow of pressurized fluid.

5. The computer implemented method according to claim 4, the method further comprising: controlling, by the processor device, a first valve of the first actuator to force the first exhaust valve to be arranged in the open position when the pressure in the combustion chamber is above the predetermined threshold pressure.

6. The computer implemented method according to claim 3, wherein the exhaust valve arrangement comprises a second actuator operable to arrange the second exhaust valve in the open position when exposed to a flow of pressurized fluid.

7. The computer implemented method according to claim 6, the method further comprising: controlling, by the processor device, a second valve of the second actuator to force the second exhaust valve to be arranged in the open position when the pressure in the combustion chamber is below the predetermined threshold pressure.

8. The computer implemented method according to claim 3, wherein each of the first and second exhaust valve is a pneumatically operable valve.

9. The computer implemented method according to claim 1, wherein the internal combustion engine further comprises at least one intake valve controllable to direct air into the combustion chamber during an intake stroke.

10. The computer implemented method according to claim 9, wherein the at least one intake valve is controllable to be arranged in an open position and a closed position independently of a position of a reciprocating piston arranged in a combustion cylinder of the internal combustion engine.

11. A control system comprising one or more control units configured to perform the method according to claim 1.

12. A non-transitory computer-readable storage medium comprising instructions, which when executed by the processor device, cause the processor device to perform the method of claim 1.

13. An exhaust valve arrangement operable to direct combusted exhaust gas out from a combustion chamber of an internal combustion engine, the exhaust valve arrangement comprising a first exhaust valve, a second exhaust valve, and processor device operable to control the first and second exhaust valves to assume an open and closed position, respectively, the processor device being configured to:

determine a pressure level in the combustion chamber during compression release braking, compare the pressure level with a predetermined threshold pressure; and control the exhaust valve arrangement to arrange the first exhaust valve to be arranged in an open position and to arrange the second exhaust valve in a closed position when the pressure level in the combustion chamber is above the predetermined threshold pressure.

14. A vehicle comprising an internal combustion engine, the internal combustion engine comprising an exhaust valve arrangement according to claim 13.

* * * * *